(12) United States Patent
Kaufman (10) Patent No.: US 7,769,810 B1
(45) Date of Patent: Aug. 3, 2010

(54) METHOD AND SYSTEM FOR COLLABORATIVE EDITING

(75) Inventor: Marc T. Kaufman, Woodside, CA (US)

(73) Assignee: Adobe Systems Incorporated, San Jose, CA (US)

( * ) Notice: Subject to any disclaimer, the term of this patent is extended or adjusted under 35 U.S.C. 154(b) by 337 days.

(21) Appl. No.: 11/796,037

(22) Filed: Apr. 26, 2007

(51) Int. Cl.
G06F 15/16 (2006.01)

(52) U.S. Cl. .................. 709/205; 709/246; 709/248; 715/753

(58) Field of Classification Search ......... 709/204–205, 709/246, 248; 715/751–753
See application file for complete search history.

(56) References Cited

U.S. PATENT DOCUMENTS

| | | | | |
|---|---|---|---|---|
| 6,067,551 | A * | 5/2000 | Brown et al. ................. | 707/203 |
| 6,108,668 | A * | 8/2000 | Bates et al. ................. | 707/203 |
| 6,144,991 | A * | 11/2000 | England ..................... | 709/205 |
| 6,721,921 | B1 | 4/2004 | Altman | |
| 6,879,997 | B1 * | 4/2005 | Ketola et al. ................ | 709/208 |
| 7,353,252 | B1 * | 4/2008 | Yang et al. .................. | 709/204 |
| 7,370,269 | B1 * | 5/2008 | Prabhu et al. ............... | 715/230 |
| 7,424,671 | B2 * | 9/2008 | Elza et al. ................... | 715/234 |
| 7,594,163 | B2 * | 9/2009 | Slack-Smith ................ | 715/200 |
| 2002/0065848 | A1 * | 5/2002 | Walker et al. ............... | 707/511 |
| 2003/0037111 | A1 * | 2/2003 | Yoshioka .................... | 709/205 |
| 2007/0088729 | A1 * | 4/2007 | Baca et al. ................... | 707/101 |
| 2007/0098297 | A1 * | 5/2007 | Fushiki et al. .............. | 382/276 |
| 2007/0118598 | A1 * | 5/2007 | Bedi et al. .................. | 709/204 |
| 2007/0186157 | A1 * | 8/2007 | Walker et al. ............... | 715/530 |
| 2007/0186171 | A1 * | 8/2007 | Junuzovic et al. ........... | 715/751 |
| 2007/0198657 | A1 * | 8/2007 | Saliba et al. ................ | 709/219 |
| 2007/0271502 | A1 * | 11/2007 | Bedi et al. .................. | 715/512 |
| 2008/0072141 | A1 * | 3/2008 | Hodel-Widmer ............ | 715/255 |
| 2008/0172607 | A1 * | 7/2008 | Baer ........................... | 715/255 |
| 2008/0235579 | A1 * | 9/2008 | Champion et al. .......... | 715/273 |

OTHER PUBLICATIONS

Koch M., "Design Issues and Model for a Distributed Multi-User Editor", Comput. Support. Coop. Work (CSCW) (Netherlands), Computer Supported Cooperative Work (CSCW), 1995, Kluwer Academic Publishers, Netherlands, vol. 3, No. 3-4, ISSN 0925-9724, pp. 359-378, XP002043748.*

* cited by examiner

*Primary Examiner*—Oanh Duong
(74) *Attorney, Agent, or Firm*—Schwegman Lundberg & Woessner, P.A.

(57) ABSTRACT

A system for collaborative editing may include a viewer to open a master copy of an electronic document in a local editor, a first queue to store edit operations requested by the local editor, a second queue to store edit operations requested by the remote editor, an update detector to detect a request from the remote editor to perform an edit operation on a remote copy of the electronic document, an update module to perform the edit operation on the master copy of the electronic document and to update the second queue with the edit operation, and a distributor to propagate the edit operation to the remote copy of the electronic document.

21 Claims, 6 Drawing Sheets

METHOD AND SYSTEM FOR COLLABORATIVE EDITING

TECHNICAL FIELD

Example embodiments relate to a method and system for collaborative editing.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A document may be described as a set of information designed and presented as an individual entity. A publication is one example of a document. It may contain logical subunits such as parts, sections, or chapters; but it is typically created, updated, and presented as a single unit. An electronic document is an electronic representation of a paper document encoded in some machine processable form.

In the world of collaboration on electronic documents, multiple users may have the same or similar views of a shared space, which may include editable electronic documents (or simply documents). In some existing systems, one user may owns the space, and that user is the only one who can perform edits. Other users can share a "chat" window, but that content is serialized based on time of arrival. However, existing systems do not permit multiple users to simultaneously edit an electronic document, e.g., a formatted document or a page descriptor language document, such as a document in a Portable Document Format (PDF).

Documents that require input from multiple sources are common in the creative arena. Some examples include newspapers, magazines, textbooks, and advertising pieces. Conventionally, subparts of a document (e.g., individual book chapters) are separately created and edited by individual authors. These subparts are then placed in a document repository and merged into a final-form document by an editor. The final-form document is then passed around for review and comment, to permit the individual authors to update their pieces. The editor then performs another merge and the cycle continues until all of the authors agree on the final version of the document or until the publication deadline is reached. The merging process described above may be cumbersome and time consuming, especially where multiple authors provided updates to the same portion of the document.

BRIEF DESCRIPTION OF DRAWINGS

Embodiments are illustrated by way of example and not limitation in the figures of the accompanying drawings, in which like references indicate similar elements and in which.

DETAILED DESCRIPTION

A method and system are described to allow multiple users to participate in collaborative editing of an electronic document, such as, for example, a rich text formatted document. A process of simultaneous editing of an electronic document by multiple users may be referred to as collaborative editing. It will be noted, that, for the purposes of this description, the terms "document" and "electronic document" may be used interchangeably.

Using peer-to-peer or any other collaborative communication technology on reasonably fast networks, an editing experience similar to local editing may be provided. A system that permits direct and simultaneous editing of the final form document may contribute to making the review and update process less time consuming. Each person who participates in collaborative editing of a document may be able to see, almost immediately, how the changes performed by other participants affect the document. Thus, the collaboration on the document may be performed in real-time, which may permit participants to determine the most effective updates in an efficient manner.

In one example embodiment, a system to permit collaborative editing of a document may utilize a plurality of compatible editor applications (or simply editors) that are linked via a high-speed low-latency communication system. Such communication system may be, for example, a server based communication system, a peer-to-peer communication system, a direct wire communication system, a wireless communication system or any other communication system. For the purposes of this discussion, all editors may be seen as editing the "same" file. For example, all editors that participate in collaborative editing, may open the same document (or file) by the file name on a shared file system or a document repository. In some example embodiments, the document that is being opened for collaborative editing may have a unique identification (ID) associated with the document, that is the same for each instance of the document that is being opened by the compatible editor applications.

One of the editor applications that participates in collaborative editing of a document may be designated the "leader," which means that it is responsible for keeping the master copy of the document. In one example embodiment, an editor that opens a first instance of the document is designated as a leader. Various other methods of determining a leader, such as based on the user's permissions settings, may be utilized. As other editors open the document, they determine that another editor (the leader) has already opened the document and request copies of the accumulated edits since the file was last put into storage. As a result, the copies of the document opened by other, non-leader, editors have copies of the document that are synchronized with the master copy maintained by the editor that is designated as a leader.

Any editor that that participates in collaborative editing of a document but is not the leader may perform an edit operation by sending a requested action to the leader for execution. The leader may then send the result to all editors that participates in collaborative editing of the document. Because all edit operations are synchronized with respect to the leader's master copy of the document, all editors will see identical results. For responsiveness, in one example embodiment, the editor that requests an edit operation may apply the change conditionally until the leader sends the resulting change back to the editor. If the requested edit operation conflicts with the edits of any other users, the conditional change may be rolled back in favor of the synchronized edit.

Because all editors have identical copies of the file, in one example embodiment, any editor that participates in collaborative editing of the document can pick up the leader role if the editor that is currently the leader closes the editing session of the document. In one example embodiment, the last editor to close the document, may be responsible for storing the latest version of the document back into the file system or the document repository. The changes to the document may be stored periodically, throughout the collaborative editing session, at any time, in order to guard against network or power failure.

In order to provide for synchronization between the copies of the document in the course of collaborative editing session, each participating editor may maintain separate operation queues for every other instance of the document opened by other editors that participate in a collaborative editing of the document. For example, one may think of this technique as representing a plurality of editors in the same box, where the editors are sharing a single document.

Each operation queue may be configured to store edit operations (e.g., a type operation, a delete operation, an undo or redo operation, etc.) requested by its associated editor. In one example embodiment, the operation queues are independent, but are interleaved according to the time the operation was performed. The time of an operation may be determined based on the leader's clock. The editor that is the leader may be responsible, in one example embodiment, for notifying all of the other editors that participate in a collaborative editing of the document whenever an edit operation requested by one of the editors takes place. Because of the shared state, it may be possible to detect conflicts immediately.

The operation queues, in one example embodiment, are maintained on a per-document basis, so that the collaboration is effectuated on a per-document basis, even where multiple documents are being opened by an editor. Some or all of common editor features, such as Undo/Redo, may be supported in one example embodiment.

Any communication system, e.g., a communication system similar to peer-to-peer rendezvous, may be used for coordinating multiple simultaneous editing sessions. Thus, a system and method to permit collaborative editing of a document may be implemented in the context of a network environment and may be discussed with reference to FIG. 1.

Figure 1:
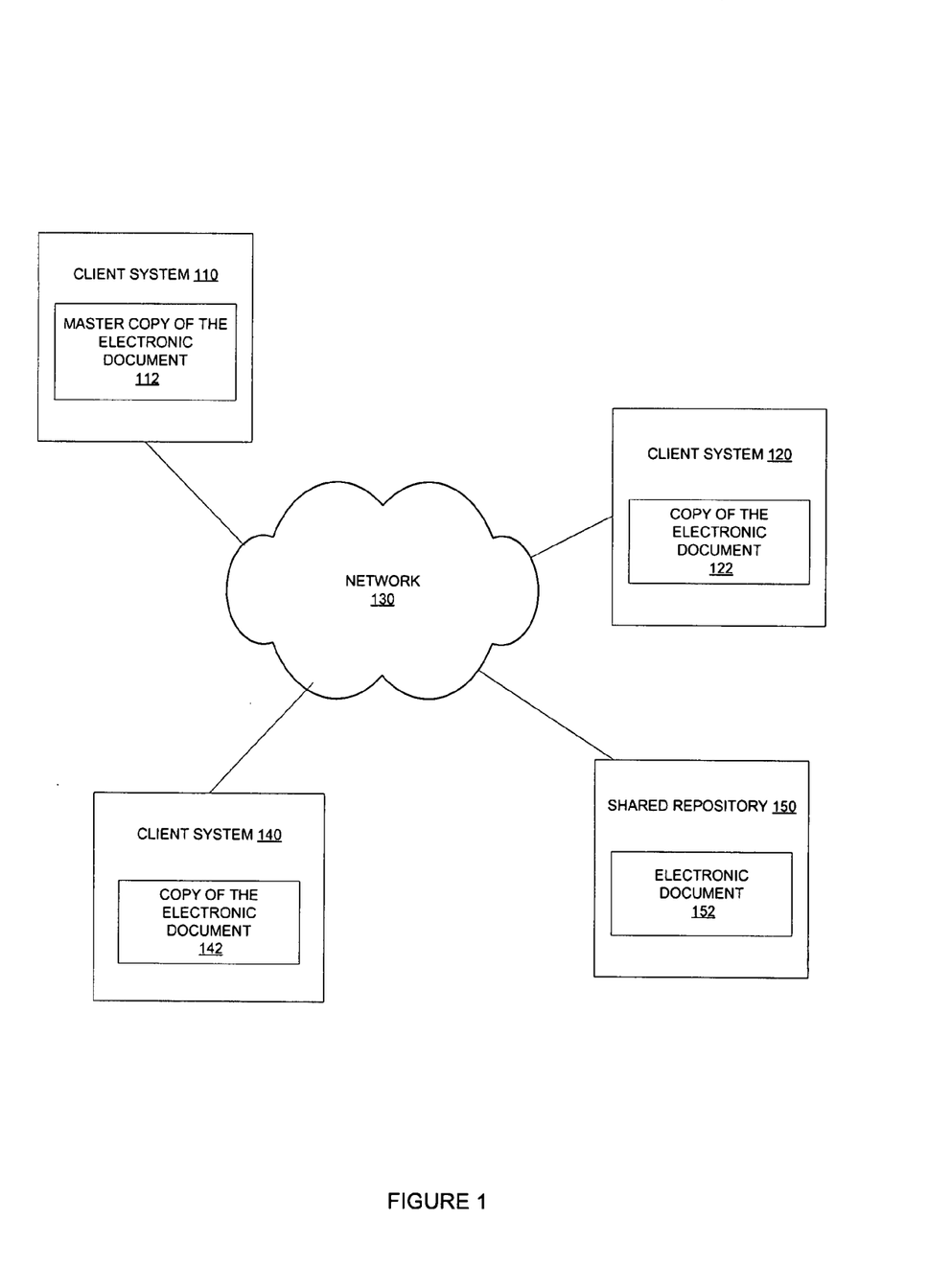
FIG. 1 is a block diagram showing an architecture within which a method and system for collaborative editing may be implemented, in accordance with an example embodiment.

FIG. 1 shows an example environment 100, within which a method and system for collaborative editing may be implemented. The network environment 100 may include a plurality of client systems—a client system 110, a client system 120, and a client system 140. The client systems 110, 120, and 140 may be in communication with each other via a network 130. The communications network 130 may be a public network (e.g., the Internet, a wireless network, a public switched telephone network (PSTN), etc.) or a private network (e.g., LAN, WAN, Intranet, etc.).

Each of the client systems 110, 120, and 140 may host an editor application capable of opening an electronic document 152 stored at a shared repository 150 and may participate in collaborative editing of the electronic document 152. As shown in FIG. 1, the client system 110 is designated to be a leader for the purposes of the current collaborative editing session, and therefore has a master copy of the electronic document 112 opened. The client systems 120 and 140 have the respective copies 122 and 142 opened by their local editor applications that are configured to permit collaborative editing. An example system for collaborative editing that may be implemented within an editor application is described below with reference to FIG. 2.

Figure 2:
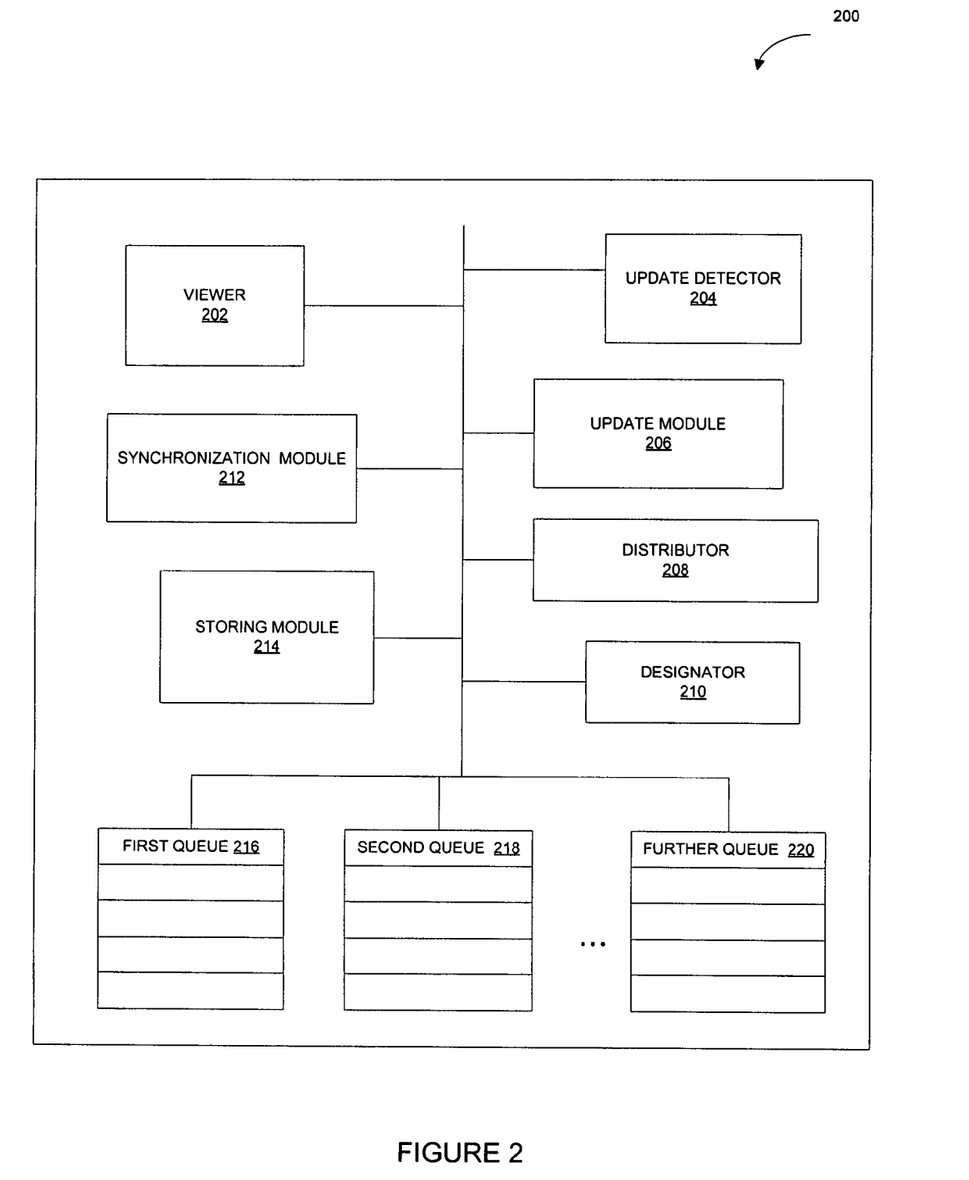
FIG. 2 is a block diagram illustrating a system, in accordance with an example embodiment, to permit a user to participate in a collaborative editing session.

FIG. 2 shows a block diagram illustrating an example system 200 to permit a user to participate in a collaborative editing session. The system 200 may include a viewer 202, an update detector 204, an update module 206, a distributor 208, a designator 210, a synchronization module 212, and a storing module 214. The viewer 202 may be configured to open a copy of an electronic document in a local editor. The update detector 204 may be configured to detect a request from a remote editor that participates in a collaborative editing session to perform an edit operation on a remote copy of the electronic document. The update detector 204 would receive such request in a situation where the local editor is designated as a leader and the copy of the electronic document is designated as a master copy. The update module 206 may be configured to perform the edit operation on the master copy of the electronic document, e.g., in response to a request from another editor. The update module 206 may also be responsible for determining whether the requested edit operation conflicts with another edit operation that is being performed at the same time for another participating editor. The distributor 208 may be configured to propagate the edit operation to other editors that participate in the collaborative editing session.

Also illustrated in FIG. 2 are operation queues to store edit operations requested by different editors that are participants of a collaborative editing session (participants). As mentioned above, each participant maintains an operation queue for every other participant, as well as its own operation queue. In FIG. 2, a first operation queue 216 is associated with the local editor and may be configured to store edit operations requested by the local editor. A second operation queue 218 and a further operation queue 220 are associated with remote participants and are configured to store edit operations requested by their respective associated editors. An appropriate operation queue is updated each time an editor requests an edit operation and the requested edit operation is approved by the leader. Various operations performed by the system 200, according to an example embodiment, may be described with reference to FIG. 3.

Figure 3:
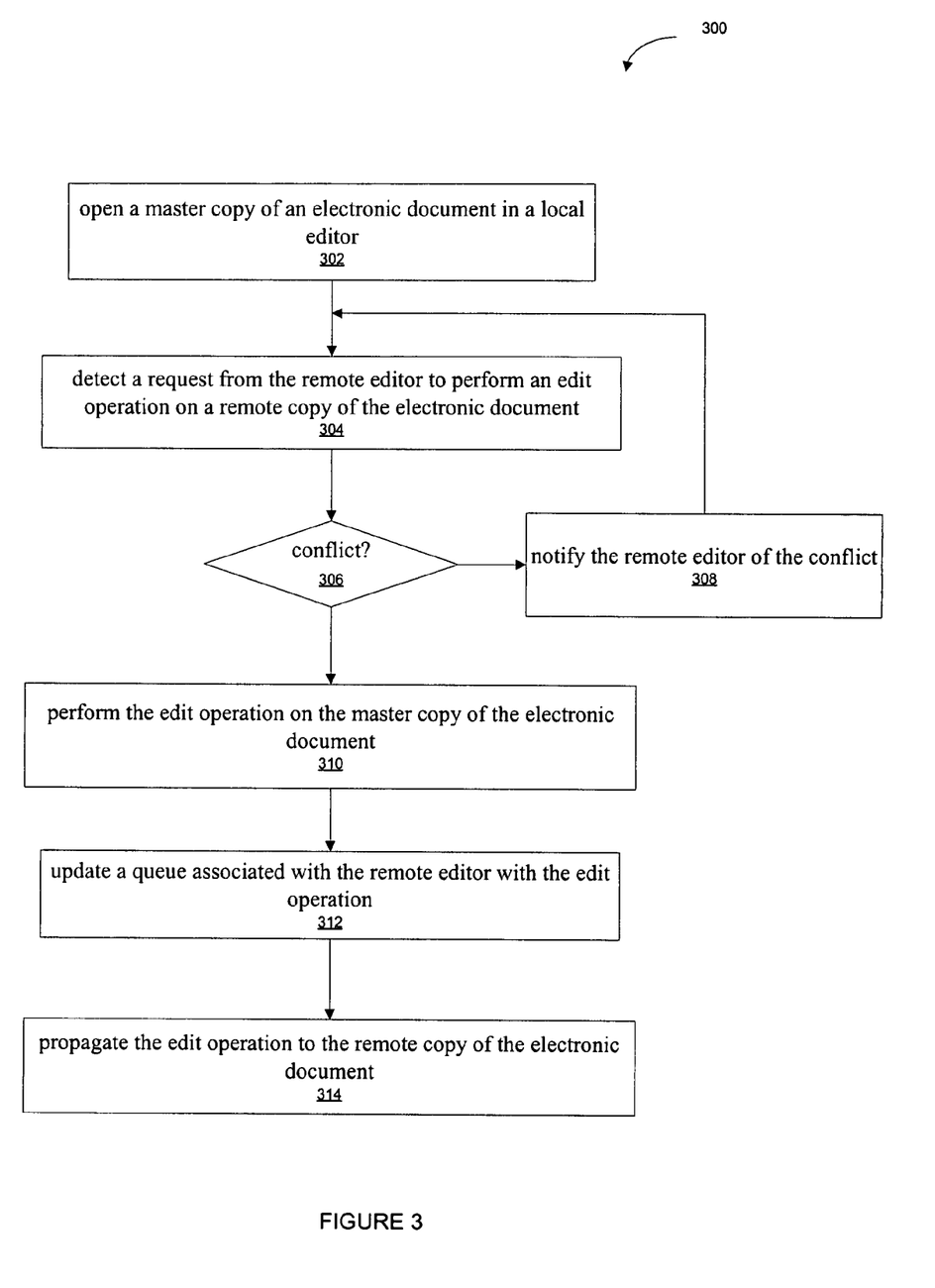
FIG. 3 is a flow chart illustrating a method for collaborative editing, in accordance with an example embodiment.

FIG. 3 is a flow chart illustrating a method 300 for collaborative editing, in accordance with an example embodiment. The method 300 may be performed by processing logic that may comprise hardware (e.g., dedicated logic, programmable logic, microcode, etc.), software (such as run on a general purpose computer system or a dedicated machine), or a combination of both. It will be noted, that, in an example embodiment, the processing logic may reside in any of the modules shown in FIG. 2.

In one example embodiment, as mentioned above, a local editor that is the first editor to open an electronic document for the purpose of collaborative editing is designated as a leader and its instance of the electronic document is designated as the master copy of the electronic document. As shown in FIG. 3, the method 300 commences with the viewer 202 opening the master copy of an electronic document at operation 302. The local editor at that time activates the first operation queue 216 in order to store any edit operations requested and performed by the local editor. As other editors, e.g., remote editors that are in communication with the local editor via a local area network, open the same electronic document for collaborative editing, the local editor activates operation queues for those editors, e.g., the second queue 218 and the further queue 220.

At operation 304, the local editor that is designated as the leader receives, from a remote editor, a request to perform an edit operation on an associated remote copy of the electronic document. The request is received by the update detector 204. At operation 306, the local editor determines whether the requested edit operation conflicts with another edit operation request from a different editor. The conflict may occur if, for example, two participating editors simultaneously requested two edit operation on the same portion of the document.

If it is determined, at operation 306, that there is a conflict, the remote editor is notified of the conflict at operation 308. If it is determined, at operation 306, that there is no conflict, the update module 206 performs the requested edit operation on the master copy of the electronic document at operation 310 and updates the associated operation queue (the second queue 218) at operation 312. The distributor 208 propagates the update to the remote copy of the electronic document and to all other editors that are participating in the collaborative editing session at operation 314.

As mentioned above, whenever a new participant joins a collaborative editing session, the new participant first requests the leader to synchronize its copy of the electronic document with the master copy of the electronic document. An example method to utilized in such scenario is discussed below with reference to FIG. 4.

Figure 4:
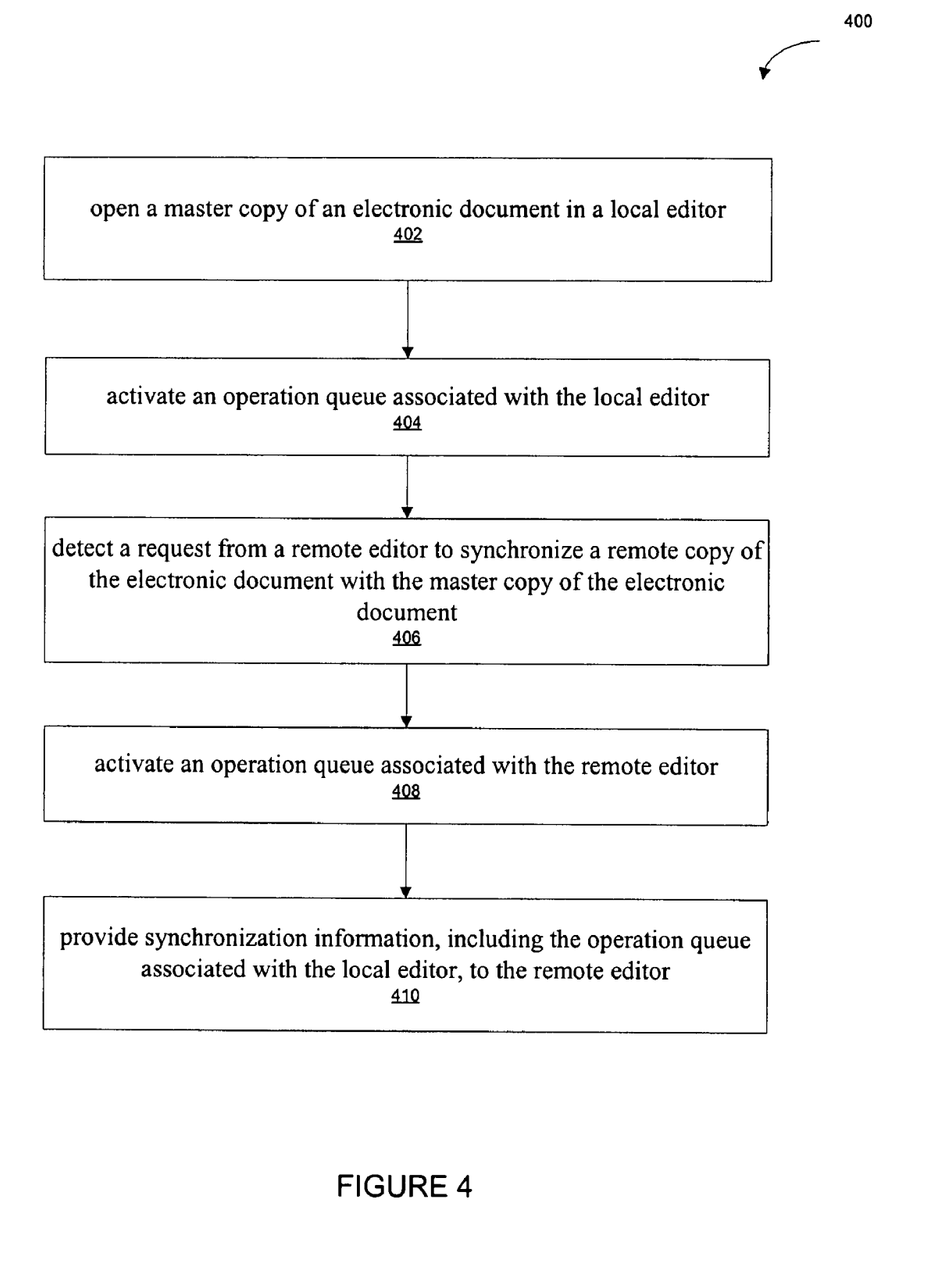
FIG. 4 is a block diagram illustrating a method, in accordance with an example embodiment, to synchronize a remote copy of an electronic document with a master copy of the electronic document.

FIG. 4 is a flow chart illustrating an example method 400 to synchronize a remote copy of an electronic document with a master copy of the electronic document in the context of collaborative editing session. The method 400 may be performed by processing logic that may comprise hardware (e.g., dedicated logic, programmable logic, microcode, etc.), software (such as run on a general purpose computer system or a dedicated machine), or a combination of both. It will be noted, that, in an example embodiment, the processing logic may reside in any of the modules shown in FIG. 2.

As shown in FIG. 4, the method 400 commences with the viewer 202 associated with the leader editor opening the master copy of an electronic document at operation 402. The leader editor activates the first operation queue 216 at operation 404. At operation 406, the synchronization module 212 detects a request from a remote editor to synchronize a remote copy of the electronic document opened by the remote editor with the master copy of the electronic document. In response, the leader editor activates the second queue 218 at operation 408 and provides synchronization information, including the first operation queue 216 associated with the local editor, to the remote editor, at operation 410.

A non-leader participant of a collaborative editing session may be designated as a new leader in the event of the current leader closing its master copy of the electronic document. Because every participant a collaborative editing session maintains operation queues for all other participants, any one of the participants may assume the role of a new leader. An example method including designating a new leader is discussed below with reference to FIG. 5.

Figure 5:
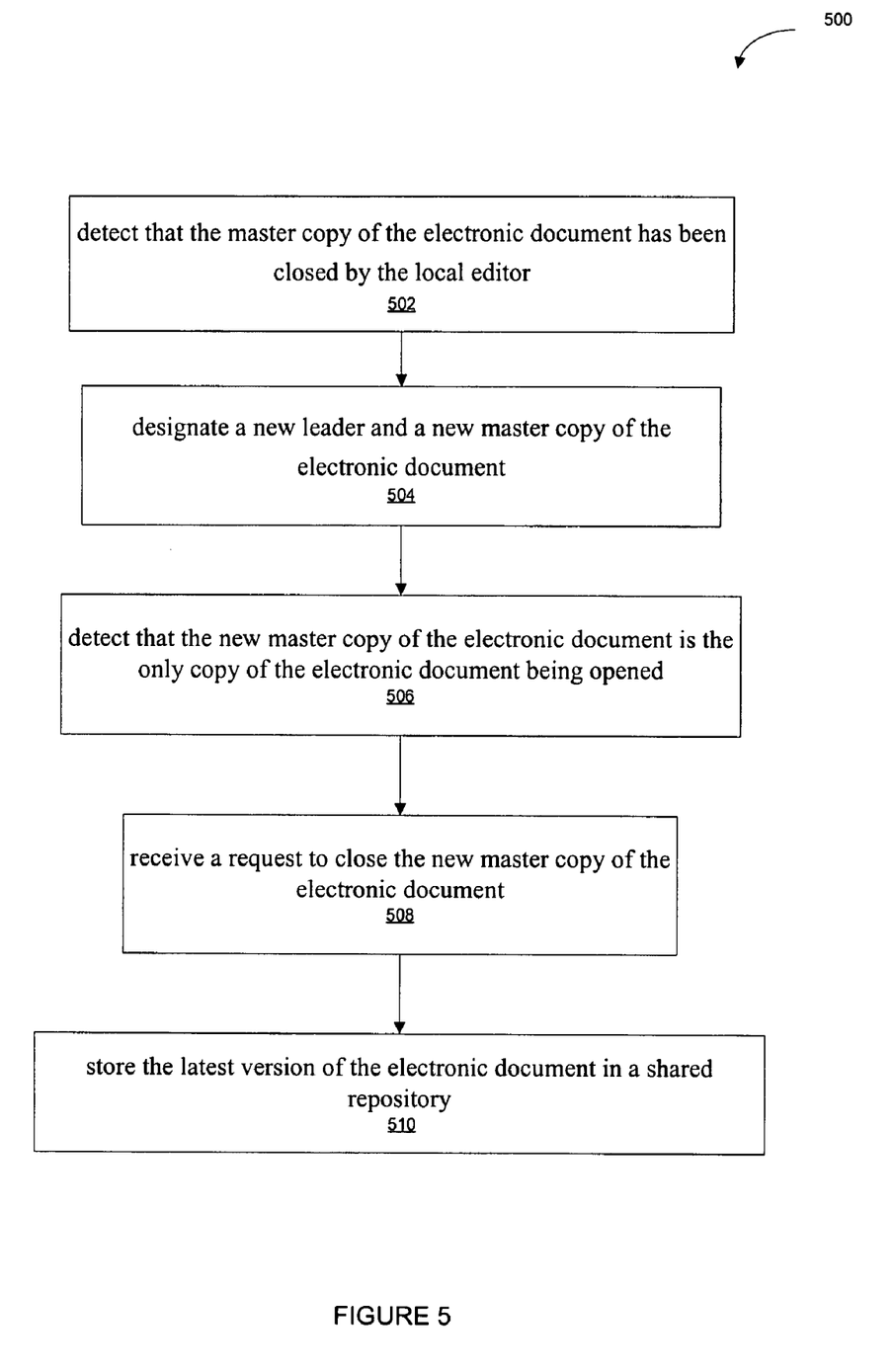
FIG. 5 is a flow chart illustrating a method to designate a new leader of a collaborative editing session, in accordance with an example embodiment.

FIG. 5 is a flow chart illustrating an example method 500 to designate a new leader when the current leader closes its master copy of the electronic document or becomes otherwise unavailable. The method 500 may be performed by processing logic that may comprise hardware (e.g., dedicated logic, programmable logic, microcode, etc.), software (such as run on a general purpose computer system or a dedicated machine), or a combination of both. It will be noted, that, in an example embodiment, the processing logic may reside in any of the modules shown in FIG. 2.

As shown in FIG. 5, at operation 502, a remote editor detects that the master copy of the electronic document has been closed by the local editor. The designator 210 at the remote editor designates itself as a new leader at operation 504 and its copy of the electronic document as a new master copy of the electronic document, at operation 506. The remote editor may then proceed to act as a leader. It will be noted that, in some embodiments, the leader may nominate a new leader according to a predetermined criteria (e.g., according to the time at which a remote editor has opened an instance of the electronic document).

As discussed above, the last participant to close its instance of the electronic document is responsible for storing the electronic document with all updates accumulated during the collaborative editing session. As shown in FIG. 5, at operation 508, the remote editor receives a request to close the new master copy of the electronic document. In response to the request, at operation 510, the storing module 214 of the remote editor stores the latest version of the electronic document in the shared repository 150 illustrated in FIG. 1.

Figure 6:
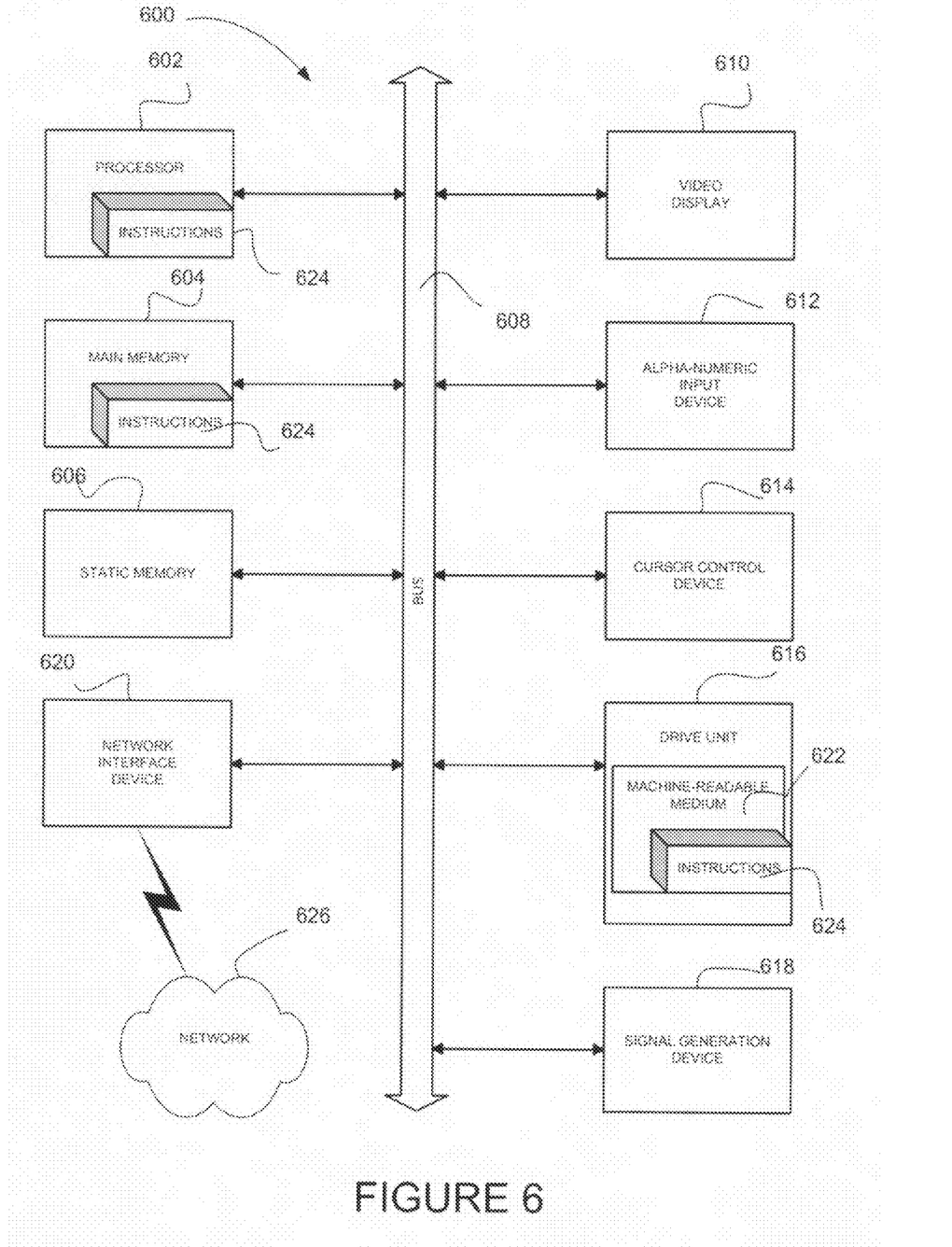
FIG. 6 illustrates a diagrammatic representation of a machine in the example form of a computer system within which a set of instructions, for causing the machine to perform any one or more of the methodologies discussed herein, may be executed.

FIG. 6 shows a diagrammatic representation of a machine in the example form of a computer system 600 within which a set of instructions, for causing the machine to perform any one or more of the methodologies discussed herein, may be executed. In various embodiments, the machine operates as a standalone device or may be connected (e.g., via network connections) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an "Moving Picture Experts Group (MPEG) Layer 3" (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620 utilizing any one of a number of well-known transfer protocols (e.g., Hyper Text Transfer Protocol (HTTP)).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Such medium may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware.

Thus, a method and system for collaborative editing have been described. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A computer-implemented system comprising:
a memory; and
at least one processor coupled to the memory, the at least one processor to implement:
  a viewer to open a master copy of an electronic document in a local editor for display at a display device;
  a first queue associated with the local editor, the first queue being to store edit operations requested by the local editor, the first queue maintained by the local editor;
  a second queue associated with a remote editor, the remote editor residing at a remote client computer, the second queue being to store edit operations requested by the remote editor, the second queue maintained by the local editor;
  an update detector to detect a network request from the remote editor to perform an edit operation on a remote copy of the electronic document, the remote copy of the electronic document being opened by the remote editor;
  an update module to:
    in response to the network request from the remote editor to perform the edit operation on the remote copy of the electronic document, perform the edit operation on the master copy of the electronic document; and
    update the second queue with the edit operation in response to the performing of the edit operation on the master copy of the electronic document; and
  a distributor to propagate, via a network communication, the edit operation to the remote copy of the electronic document, the edit operation requested to be performed on the remote copy of the electronic document and performed on the master copy of the electronic document;
wherein the viewer, the first queue, the second queue, the update detector, the update module, the local editor and the distributor are provided at a local client computer.

2. The system of claim 1, wherein the first queue and the second queue are interleaved by time.

3. The system of claim 1, wherein the distributor is to provide a copy of the first queue and a copy of the second queue to the remote editor.

4. The system of claim 1, wherein the update module is to determine that the requested edit operation does not conflict with any concurrent edit operation on the electronic document being performed by another editor.

5. The system of claim 1 comprising a designator to:
  determine that the local editor is a first editor to open a copy of the electronic document; and
  designate the local editor as a leader, the leader to maintain the master copy of the electronic document.

6. The system of claim 1, wherein the update module is to:
  detect a request from the remote editor to perform an undo operation on the electronic document;
  perform the undo operation on the master copy of the electronic document;
  update the second queue in response to the undo operation; and
  cooperate with the distributor to cause propagating of the undo operation to the remote copy of the electronic document.

7. The system of claim 1 comprising a synchronization module to:
  detect, at the local editor, a request from a further editor to synchronize a further copy of the electronic document with the master copy of the electronic document;
  generate a further queue at the local editor, the further queue associated with the further editor; and
  cooperate with the distributor to cause providing synchronization information, including the local queue, the remote queue, and the further queue, to the further editor.

8. The system of claim 1, wherein the designator is to:
  detecting, at the local editor, a request to close the master copy of the electronic document;
  nominate the remote editor as a new leader; and
  designate the remote copy of the electronic document as a new master copy of the electronic document.

9. The system of claim 1 comprising a storing module to:
  detect, at the local editor, that the master copy of the electronic document is the only copy of the electronic document being opened;
  detect a request to close the master copy of the electronic document; and
  store the latest version of the electronic document, the latest version of the electronic document including results of operations stored in the local queue and the remote queue.

10. The system of claim 1, wherein the document is in a Portable Document Format (PDF).

11. A method comprising:
  at a first client computer, opening a master copy of an electronic document in a local editor;
  at the first client computer, maintaining a first queue, the first queue associated with the local editor;
  at the first client computer, maintaining a second queue, the second queue associated with a remote editor, the remote editor provided at a second client computer;

at the first client computer, detecting a request from the remote editor to perform an edit operation on the electronic document, the remote copy of the electronic document being opened by the remote editor;

at the first client computer, performing the edit operation on the master copy of the electronic document in response to the request from the remote editor to perform the edit operation on the remote copy of the electronic document;

at the first client computer, updating the second queue with the edit operation; and propagating, by the first client computer, the edit operation to the remote copy of the electronic document.

12. The method of claim 11, wherein the first queue and the second queue are interleaved by time.

13. The method of claim 11 comprising maintaining a copy of the first queue and a copy of the second queue by the remote editor.

14. The method of claim 11, wherein the performing of the edit operation on the master copy of the electronic document comprises determining that the requested edit operation does not conflict with any concurrent edit operation on the electronic document being performed by another editor.

15. The method of claim 11 comprising:
determining that the local editor is a first editor to open a copy of the electronic document; and
designating the local editor as a leader, the leader to maintain the master copy of the electronic document.

16. The method of claim 11 comprising:
detecting a request from the remote editor to perform an undo operation on the electronic document;
performing the undo operation on the master copy of the electronic document;
updating the second queue in response to the undo operation; and
propagating the undo operation to the remote copy of the electronic document.

17. The method of claim 11 comprising:
detecting, at the local editor, a request from a further editor to synchronize a further copy of the electronic document with the master copy of the electronic document;
maintaining a further queue at the local editor, the further queue associated with the further editor;
providing synchronization information, including the local queue, the remote queue, and the further queue, to the further editor.

18. The method of claim 11 comprising:
detecting, at the remote editor, that the master copy of the electronic document has been closed by the local editor;
designating the remote editor as a new leader; and
designating the remote copy of the electronic document as a new master copy of the electronic document.

19. The method of claim 11 comprising:
detecting, at the local editor, that the master copy of the electronic document is the only copy of the electronic document being opened;
receiving a request to close the master copy of the electronic document; and
storing the latest version of the electronic document, the latest version of the electronic document including results of operations stored in the local queue and the remote queue.

20. The method of claim 11, wherein the electronic document is in a Portable Document Format (PDF).

21. A machine-readable storage medium having instruction data to cause a machine to:
open a master copy of an electronic document in a local editor at a local client computer;
maintain a first queue at the local client computer, the first queue associated with the local editor, to store edit operations requested by the local editor, the first queue maintained by the local editor;
maintain a second queue at the local client computer, the second queue associated with a remote editor, to store edit operations requested by the remote editor, the remote editor provided at a remote client computer, the second queue maintained by the local editor;
detect a request from the remote editor to perform an edit operation on a remote copy of the electronic document, the remote copy of the electronic document being opened by the remote editor;
perform the edit operation on the master copy of the electronic document in response to the request from the remote editor to perform the edit operation on the remote copy of the electronic document;
update the second queue with the edit operation; and
propagate the edit operation to the remote copy of the electronic document.

* * * * *